March 24, 1970            K. E. POPE            3,502,830

ACCELERATION RESPONSIVE SWITCH

Filed Jan. 27, 1969            2 Sheets-Sheet 1

INVENTOR.
KENNETH E. POPE
BY
Drummond, Cahill, & Phillips
ATTORNEYS

March 24, 1970 K. E. POPE 3,502,830
ACCELERATION RESPONSIVE SWITCH
Filed Jan. 27, 1969 2 Sheets-Sheet 2

INVENTOR.
KENNETH E. POPE
BY
Drummond, Cahill & Phillips
ATTORNEYS

United States Patent Office 3,502,830
Patented Mar. 24, 1970

3,502,830
ACCELERATION RESPONSIVE SWITCH
Kenneth E. Pope, Litchfield Park, Ariz., assignor to UMC Industries, Inc., a corporation of Delaware
Continuation-in-part of application Ser. No. 648,914, June 26, 1967. This application Jan. 27, 1969, Ser. No. 794,284
Int. Cl. H01h 35/02, 35/14
U.S. Cl. 200—61.45     6 Claims

ABSTRACT OF THE DISCLOSURE

An acceleration resonsive switch utilizing a fluid-filled enclosure having a pressure sensing element supported at the center thereof. The pressure sensing element comprises a bellows that contracts upon the increase in pressure caused by the acceleration of the device; the linear displacement of one end of the bellows is translated into the closure of an electrical contact by providing an electrically conducting probe adjacent to the free end of the bellows.

---

This application is a continuation-in-part of my co-pending application Ser. No. 648,914, filed June 26, 1957, and now abandoned.

The present invention pertains to acceleration responsive switches, and more particularly, to switches that may be made responsive to acceleration in all directions.

So-called omni-directional switches of the prior art are frequently utilized in a number of applications such as initiating devices for the destruction of equipment on board aircraft to prevent the predetermined equipment from falling into alien hands. Such omni-directional acceleration switches must be responsive to accelerations in all directions since it will not be known before the crash at what attitude or angle the impact will occur giving rise to the desire for the destruction. Prior art omni-directional acceleration switches are generally constructed of two conventional directional acceleration switches mounted in an orthogonal relationship to render the compounded device sensitive to accelerations along orthogonal axes; however, this orthogonal relationship renders the response characteristic of the switches non-linear. The non-linearity gives rise to problems to calibrations of the device to determine at which acceleration the switch will be activated. Further, such directional switching devices usually use a seismic mass and also include a spring system giving rise to a spring mass resonant frequency. To alleviate problems caused at this resonant frequency, designers of the prior art devices have tended to overdamp the system seriously adversely affecting the limits of response. Mechanical tolerances become critical and the effect of stray magnetic fields, temperatures, or other ambient variables tend to increase the complexity and the cost of prior art devices. Widely varying temperatures amplify temperature dependence of the components of the system.

It is therefore an object of the present invention to provide an acceleration responsive switch that may be made responsive to accelerations in all directions.

It is another object of the present invention to provide an acceleration responsive switch that may be made responsive to accelerations in all directions and is free of temperature dependence.

It is another object of the present invention to provide an acceleration responsive switch that contains no seismic mass or spring mass systems.

It is another object of the present invention to provide an acceleration responsive switch that contains no seismic mass or spring mass systems and whose output is independent of temperature.

It is still another object of the present invention to provide an acceleration responsive switch that may readily be adjusted to operate at any predetermined acceleration and will be impervious to ordinary ambient variables such as temperature and stray magnetic fields.

It is still another object of the present invention to provide an acceleration responsive switch having its greatest sensitivity to accelerations along a given axis while nevertheless remaining predictably less sensitive to accelerations along other axes.

These and other objects and advantages of the present invention will become apparent to those skilled in the art as the description thereof proceeds.

Briefly, in accordance with one of the embodiments chosen for illustration, the present invention utilizes a hollow sphere filled with a fluid. The hydrostatic pressure of the fluid at the center of the sphere is readily predictable in accordance with a known formula which relates the acceleration imparted to the sphere to the pressure at the center thereof. A pressure-sensitive bellows is rigidly mounted at the center of the sphere and is permitted to collapse upon the increase of hydrostatic pressure caused by the acceleration of the sphere. The bellows, and the free end thereof, form one electrical conductor. An electrically conductive probe is mounted through and insulated from a stem supporting the bellows, and terminates in close proximity to the free end of the bellows. The probe constitutes a second electrical conductor and may be connected into an electrical circuit with the bellows to form a normally open switch. When an acceleration of predetermined magnitude is imparted to the sphere, regardless of its direction, the bellows will contract and close the contact between the free end of the bellows and the probe. To compensate for the temperature coefficients of expansion between the fluid and the sphere, a void is left in the enclosed space within the sphere and the pressure of the void at the time the sphere is sealed is lowered below the vapor pressure of the fluid. The interior of the bellows is also provided with a vapor of the fluid contained in the sphere so that variations in the volume of the sphere caused by changes in temperature do not affect the bellows and simply result in the condensation or evaporation of the fluid.

The present invention may more readily be described by reference to the accompanying drawings, in which.

Figure 1:
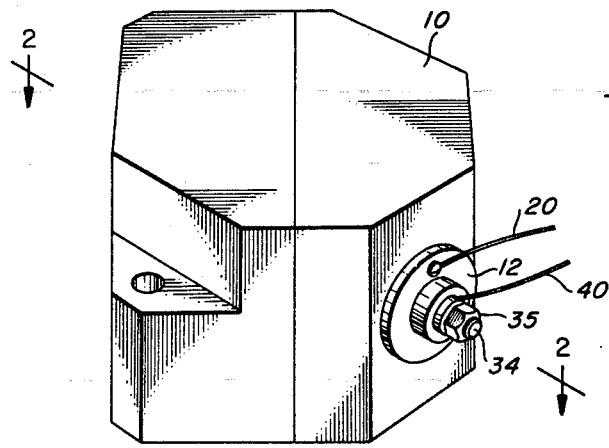
FIGURE 1 is a perspective view of one embodiment of the acceleration responsive switch constructed in accordance with the teachings of the present invention.
Figure 2:
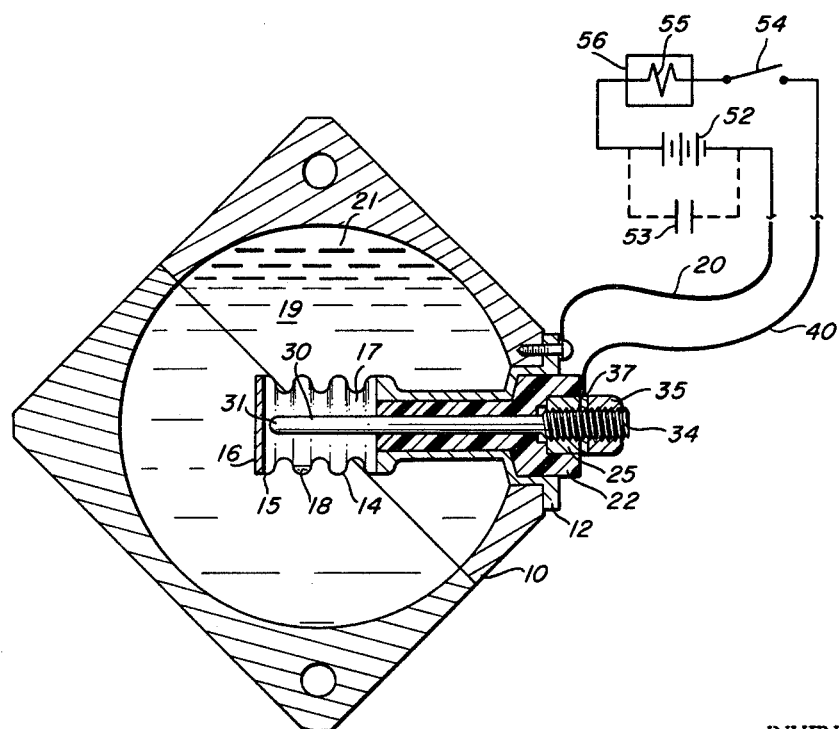
FIGURE 2 is a cross-sectional view of FIGURE 1 taken along line 2—2.

Referring now to FIGURES 1 and 2, it may be seen that the enclosure of the acceleration responsive switch shown therein is constructed from a single metal block that has first been cut in two and subsequently hollowed to form opposing hemispheres. One corner of the block has been flattened to permit convenient mounting of a stem 12. The stem is secured to the enclosure 10 in any convenient manner such as by braising and/or by screw attachment. The stem 12 forms a support for a pressure-sensing bellows 14 secured to the end of the stem 12. The free end of the bellows 15 is capped 16 to thereby provide an enclosure 17 that may be used as a reference pressure source. The stem 12, the bellows 14, and the cap 16 form a conductor connected to an external electrical circuit through a conductor 20.

An insulating sleeve 22, which may be formed of any rigid electrical insulating material such as a phenolic resin, is provided with an internally threaded metal insert 25. A probe 30, the end 31 of which is appropriately crowned to form an electrical contact, is slidably mounted within the sleeve 22 and is axially positionable through the expediency of an enlarged threaded end 34 integral therewith. The position of the probe 30 is secured by a lock nut 35; a washer 37 is shown between the nut 35 and the internally threaded insert 25 to provide a means for connecting the probe 30 to an external electrical circuit through a conductor 40. A simplified schematic electrical circuit is shown to facilitate the description of the operation of the present device in an environment likely to use an acceleration responsive switch of the type disclosed. The circuit comprises a source of electrical energy such as a battery 52 and, to indicate that in some instances a charged capacitor is used as a source of energy, a capacitor 53 is shown connected into the circuit by dotted lines. The circuit includes an arming switch which would normally be held open except when the device has been deliberately armed and is in operation. In series with the power source is a resistance wire device 55 used to ignite an initiator 56 that, in turn, may be used to trigger an explosive charge (not shown). The enclosure 10 is provided with a spherical opening therein that is filled with a liquid 19 which may be a suitable petroleum-based liquid such as oil and a void 21 is maintained. A drop of liquid 18 identical to the liquid 19 is placed within the bellows 14. The void 21 and the space within the bellows 14 is subsequently evacuated to a pressure lower than the vapor pressure of the oil in the evacuation temperature.

The operation of the device of FIGURES 1 and 2 may now be described. The pressure at the center of the sphere is given by the equation:

$$p = rdg$$

where $r$ = the radius of the sphere
$d$ = the density of the fluid
$g$ = the accelation applied to the device.

Since we know the pressure at which we want the circuit to close, and we know the contraction of the bellows 14 at that pressure, the probe 30 may be screwed into the threaded insert 25 until the end thereof contacts the free end 16 of the bellows. The probe may then be "backed off" a number of turns corresponding to the distance that the bellows 14 will contact at the predetermined pressure. The probe will then be locked in position and the conductors 20 and 40 may be connected to the external electrical circuit. It may be noted that the center of the volume of the bellows 14 coincides with the center of the sphere. When the sphere is subjected to an acceleration, the hydrostatic fluid pressure within the sphere will rise, causing the bellows to contract. When the predetermined acceleration has been reached, the pressure will have caused the free end of the bellows 16 to come into electrical contact with the end 31 of the probe 30. Thus, the electrical circuit will have been completed at the designated acceleration. The direction of the acceleration is immaterial since the pressure in the enclosure 10 is equally sensitive to accelerations in all directions. Expansion or contraction of the components as a result of the changes in temperature will not cause expansion or contraction of the bellows 14 since the spaces within the system not filled with liquid contain a saturated vapor of the liquid. Increases in pressure caused by temperature changes therefore result in condensation or evaporation of the liquid and do not cause movement or displacement of the free end 16 of the bellows 14.

Figure 3:
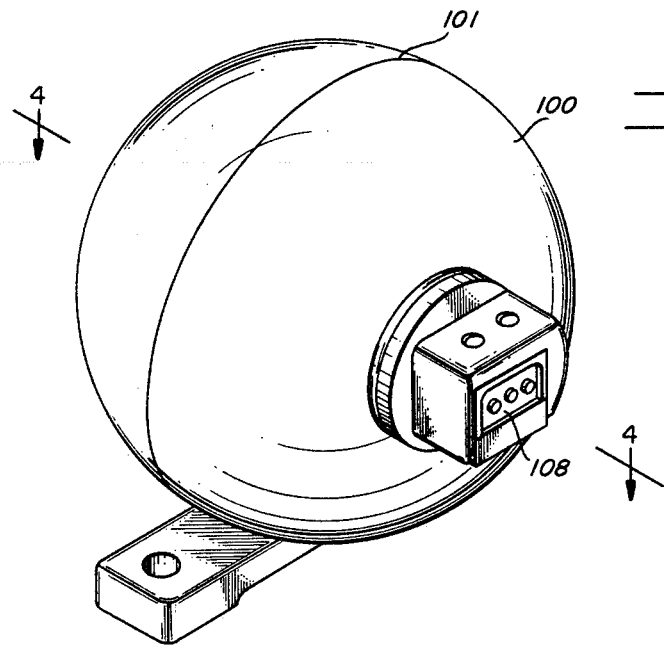
FIGURE 3 is a perspective view of another embodiment of the present invention.
Figure 4:
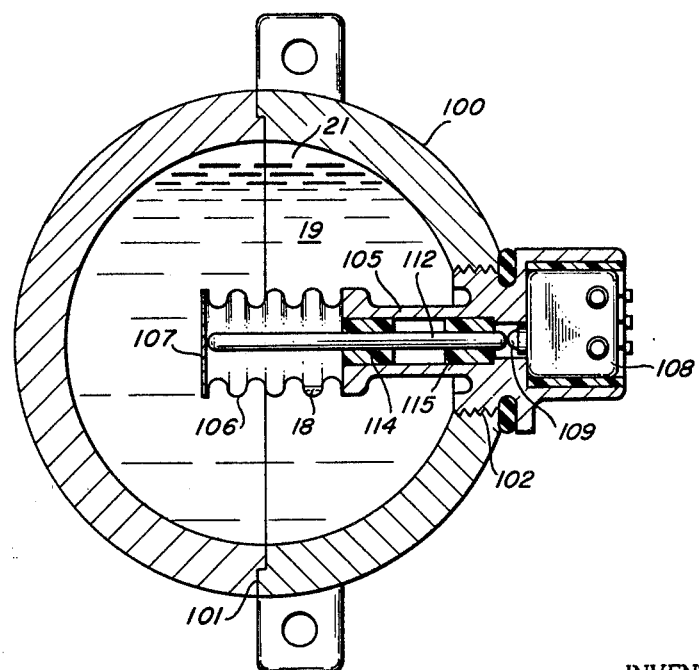
FIGURE 4 is a cross-sectional view of FIGURE 3 taken along line 4—4.

Referring now to the embodiment shown in FIGURES 3 and 4, it may be seen that an enclosure 100 forming a sphere is manufactured from two hemispheres joined at the seam 101. One of the hemispheres has an opening 102 therein for threadably receiving and supporting the stem 105 which, in turn, supports the bellows 106. Unlike the preceding embodiment, the bellows 160, and the free end thereof 107, does not act as an electrical conductor; rather, a microswitch of a conventional design 108 is mounted with the actuating contact button 109 in abutting relation with an actuating rod 112. The actuating rod is axially movably supported in bushings 114 and 115 and is in abutting contact with the button 109 and the free end 107 of the bellows 106. Since the actuating rod 112 has mass, accelerations imparted to the enclosure 100 axially of the shaft 112 would result in a force not proportional to the hydrostatic fluid pressure within the enclosure 100; therefore, the center of the volume displaced by the bellows 106 is axially displaced from the center of the sphere 100 to compensate for the mass of the actuating rod 112. Liquid 19 and liquid 18 as well as the void 21 are provided in the embodiment of FIGURES 3 and 4 in a manner identical to that previously described in connection with FIGURES 1 and 2.

The operation of the device of FIGURES 3 and 4 is similar to that given in connection with FIGURES 1 and 2; however, upon attaining the predetermined acceleration, the pressure exerted on the bellows 106 causes the latter to contract and the linear displacement of the free end 107 of the bellows is transmitted to the button 109 through the axial displacement of the actuating rod 112. Since the microswitch 108 is a device well known in the art, it is not necessary to illustrate a sample external circuit as in the case of the embodiment of FIGURES 1 and 2.

In both of the embodiments chosen for illustration, the enclosure was spherical; however, both the embodiments in FIGURES 1 and 2 and in FIGURES 3 and 4 may readily be modified so that the enclosures are ellipsoidal rather than spherical. By making either of the enclosures 10 or 100 ellipsoidal, and by arranging the major axis of the ellipsoid coincidental with the axis of the actuating rod 112 or the axis of the probe 30, the acceleration responsive device exhibits variable sensitivity while nevertheless being sensitive to accelerations in all directions. For example, the ellipsoidal enclosure may have a major axis twice that of the minor axis and if the major axis coincides with the axis of, for example, the probe 30, the acceleration responsive switch will have a sensitivity to accelerations along the major axis approximately one half that of the sensitivity along the minor axis. Since the shape of the enclosure is known, the pressure response and thus the switching of the electrical circuit may be programmed to occur at certain acceleration forces along a given axis and at substantially higher acceleration forces along other axes. The acceleration responsive switch of the present invention may readily be made extremely sensitive along a particular axis by forming the enclosure into a cylinder wherein extreme sensitivity exists along the axis of the cylinder and relative insensitivity exists along an axis perpendicular to the axis of the cylinder. It may be noted, however, that even though the device may exhibit extreme sensitivity along the axis of the cylinder, accelerations are still sensed in all directions. It will therefore be obvious to those skilled in the art that the specific dimensions of the acceleration responsive switch of the present invention may be designed in accordance with a predetermined application in order to provide acceleration response varying in magnitude in accordance with the deviation from a prescribed axis.

I claim:

1. An acceleration responsive switch comprising: a sealed enclosure containing liquid and a vapor of said liquid; a collapsible bellows containing a vapor of said liquid supported within said enclosure, said bellows having a free end to permit displacement thereof in response to contraction of said bellows; means responsive to a predetermined displacement of said free end for opening or closing electrical contacts.

2. The combination set forth in claim 1, wherein said enclosure is spherical.

3. The combination set forth in claim 1, wherein said enclosure is ellipsoidal.

4. The combination set forth in claim 1, wherein said enclosure is cylindrical.

5. The combination set forth in claim 1, wherein said means responsive to a displacement comprises an electrically conducted probe mounted in proximity to the free end of said bellows for making electrical contact therewith when said free end is displaced in response to a contraction in said bellows.

6. The combination set forth in claim 1, wherein said means responsive to a displacement comprises an actuating rod having one end thereof in contact with the free end of said bellows and an electrical switch in contact with the opposite end of said actuating rod.

References Cited

UNITED STATES PATENTS

| | | | |
|---|---|---|---|
| 1,354,069 | 9/1920 | Terhaar | 200—81 |
| 3,072,760 | 1/1963 | Hazen | 200—61.45 |
| 3,270,565 | 9/1966 | Hawley et al. | 73—497 |

ROBERT K. SCHAEFER, Primary Examiner

M. GINSBURG, Assistant Examiner

U.S. Cl. X.R.

73—497; 102—70.2; 200—61.53